US012663144B2

(12) United States Patent
Gade et al.

(10) Patent No.: US 12,663,144 B2
(45) Date of Patent: Jun. 23, 2026

(54) SPRING SYSTEM FOR MOUNTING A CEILING FIXTURE

(71) Applicant: ABL IP Holding, LLC, Atlanta, GA (US)

(72) Inventors: Srinivas Gade, Cumming, GA (US); Justin Lechlitner, Carmel, IN (US); Aaron Fryzek, Wheaton, IL (US); Brandon Mundell, Indianapolis, IN (US)

(73) Assignee: ABL IP Holding, LLC, Atlanta, GA (US)

(*) Notice: Subject to any disclaimer, the term of this patent is extended or adjusted under 35 U.S.C. 154(b) by 0 days.

(21) Appl. No.: 19/304,032

(22) Filed: Aug. 19, 2025

(65) Prior Publication Data

US 2026/0104158 A1 Apr. 16, 2026

Related U.S. Application Data

(60) Provisional application No. 63/706,234, filed on Oct. 11, 2024.

(51) Int. Cl.
*F21S 8/02* (2006.01)
*F21V 21/04* (2006.01)

(52) U.S. Cl.
CPC ............ *F21V 21/047* (2013.01); *F21S 8/026* (2013.01)

(58) Field of Classification Search
CPC ................................ F21V 21/047; F21S 8/026
See application file for complete search history.

(56) References Cited

U.S. PATENT DOCUMENTS

| | | | | |
|---|---|---|---|---|
| 2019/0368671 | A1* | 12/2019 | Pace | F21S 8/026 |
| 2022/0082244 | A1* | 3/2022 | Lupien | F21V 25/12 |
| 2023/0020307 | A1* | 1/2023 | Smith | F21V 21/045 |
| 2024/0418344 | A1* | 12/2024 | Liu | F21V 5/046 |

* cited by examiner

*Primary Examiner* — Evan P Dzierzynski
(74) *Attorney, Agent, or Firm* — Secant IP, PLLC

(57) ABSTRACT

The present disclosure provides a spring system to removeably affix a ceiling light fixture to a frame. The spring system includes a central bracket member coupled to the light fixture and having a top portion and a bottom portion. A first loop-shaped wing member and a second loop shaped wing member are pivotally coupled to the central bracket member, each extending away from each other and the central bracket member. The wing members having a first unbiased position to a second biased position; wherein the second biased position is represented as a spreading the wings away from one another and further away from the central bracket member. Movement of the light fixture relative to the frame causes the wing members to pivot from the first unbiased position to the second biased position.

18 Claims, 9 Drawing Sheets

SPRING SYSTEM FOR MOUNTING A CEILING FIXTURE

CROSS REFERENCE TO RELATED APPLICATIONS

The present application claims the benefit of U.S. Provisional Application Ser. No. 63/706,234, filed Oct. 11, 2024, which is hereby incorporated by reference in its entirety.

TECHNICAL FIELD

The present disclosure is generally directed to a spring system for a ceiling fixture, and, more particularly to spring system to secure an in-ceiling light fixture to a frame.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The present disclosure provides a spring system to removeably affix a ceiling light fixture to a frame. The spring system includes a central bracket member coupled to the light fixture and having a top portion and a bottom portion. A first loop-shaped wing member and a second loop shaped wing member are pivotally coupled to the central bracket member, each extending away from each other and the central bracket member. The wing members having a first unbiased position to a second biased position; wherein the second biased position is represented as a spreading the wings away from one another and further away from the central bracket member. Movement of the light fixture relative to the frame causes the wing members to pivot from the first unbiased position to the second biased position.

Figure 1B:
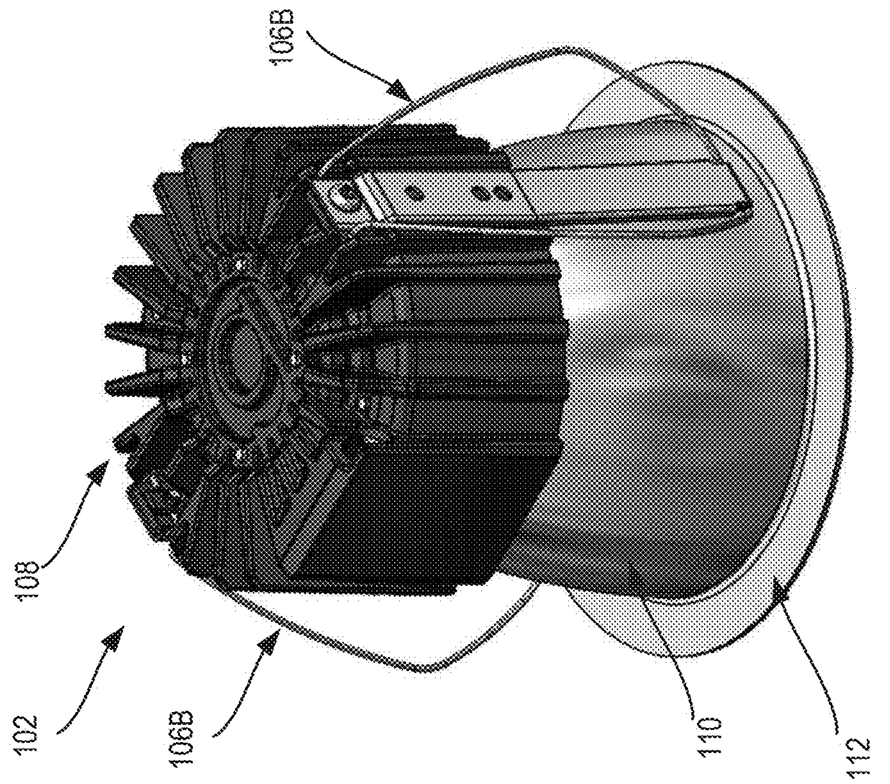
FIGS. 1A-1L illustrate various views of various features of a ceiling light structure according to one embodiment of the present disclosure.
Figure 1A:
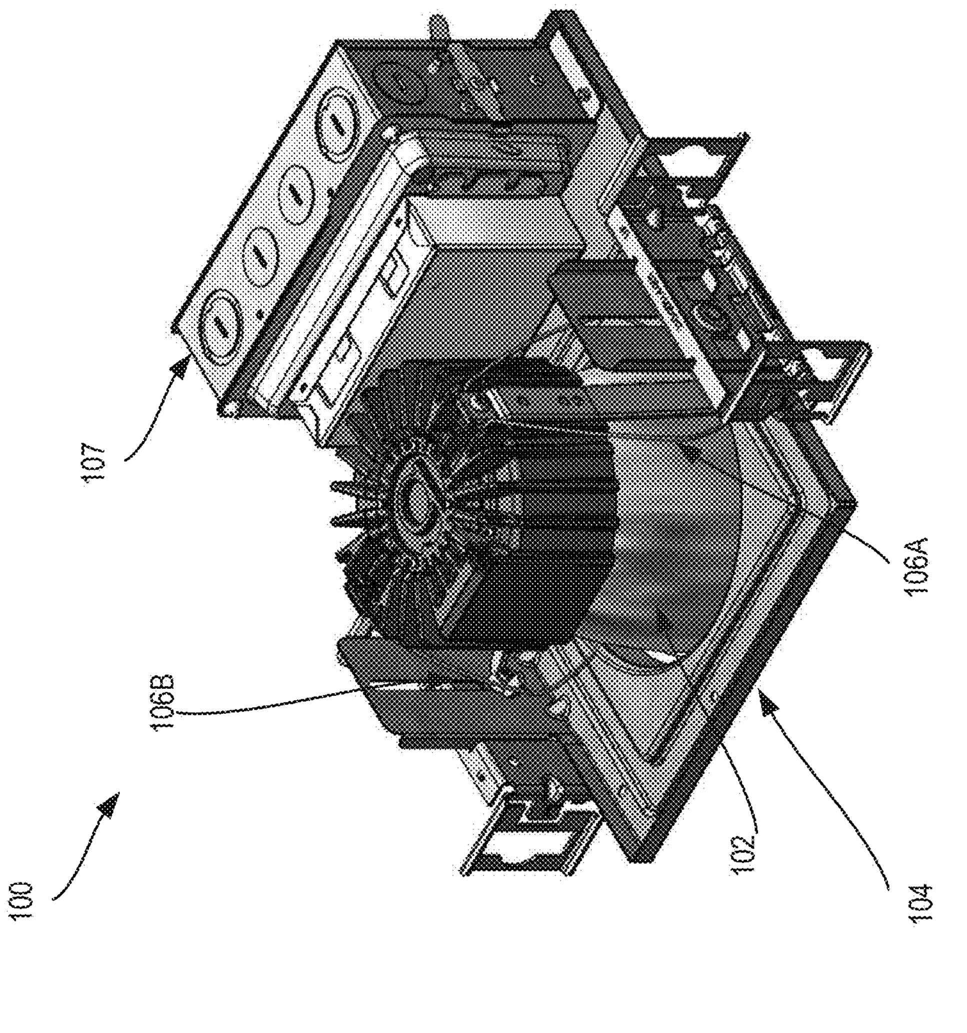

FIGS. 1A-1J illustrate various views of a ceiling light structure 100 according to one embodiment of the present disclosure. FIG. 1A illustrates a perspective view of the ceiling light structure 100. The ceiling light structure 100 includes a light fixture 102, a frame 104, and mounting springs 106A and 106B to secure the light fixture 102 to the frame 104, as will be described in greater detail below. In this embodiment, the light fixture 102 has a generally circular cross-sectional shape, however, in the light fixture 102 may have any cross sectional shape such as rectangular, oval, irregular, etc., The frame 104 is generally dimensioned to be positioned above a ceiling element (not shown), for example, above a drop ceiling tile, etc., having a cutout opening to receive the light fixture 102. The ceiling light structure 100 also includes electronic components, shown generally at 107, disposed on/adjacent the frame 104 to drive the light fixture 102, as is known The electronic components 107 may include, for example, driving circuitry, converter circuitry, communications circuitry, etc., as may be used to control and supply power to one or more lighting elements (e.g., LED lighting elements, incandescent lighting elements, etc.) disposed within the light fixture 102, as is well known. The light fixture 102 may include any known or after-developed in-ceiling light fixture, for example, an in-ceiling recessed LED fixture, incandescent fixture, etc.

Figure 1C:
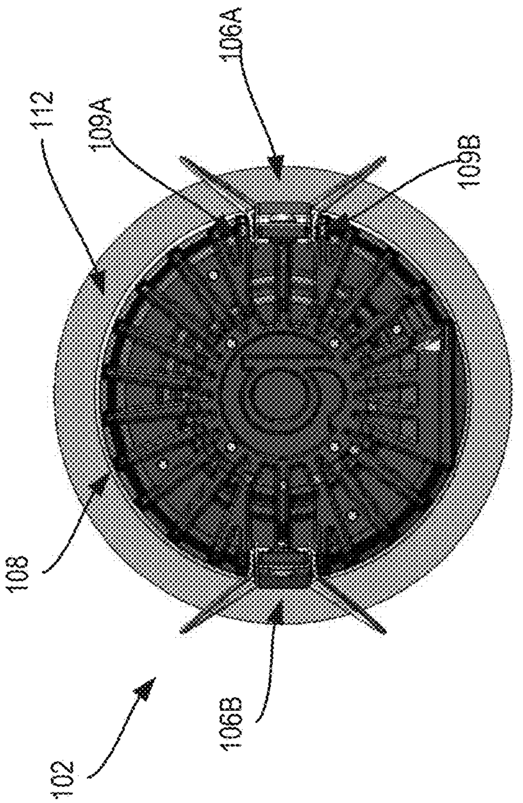
Figure 1D:
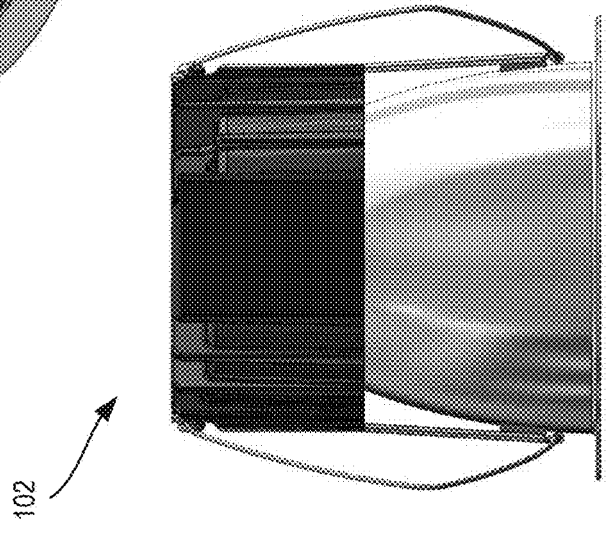
Figure 1E:
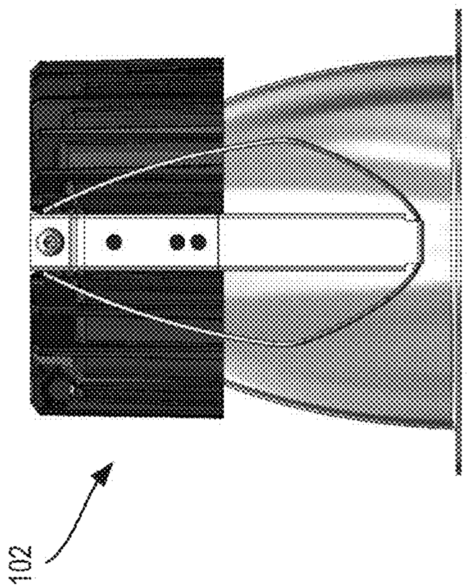

FIG. 1B illustrates a perspective view of the light fixture 102. The light fixture 102 includes a heat sink 108, a decorative trim portion/protective shroud 110 coupled to the heat sink 108, and a mounting flange 112 disposed about the end portion of the decorative trim portion/protective shroud 110. The mounting springs 106A and 106B are generally coupled to opposing sides of the heat sink 108, although in other embodiments, the mounting springs 106A and 106B may be coupled anywhere around the periphery of the heat sink 108, provided such coupling provides stable support for the fixture 102, for example, the mounting springs 106A and 106B may be coupled at opposing sides of the heat sink 108 or slightly offset therefrom, etc., FIG. 1C illustrates a top-down view of the light fixture 102. As illustrated, in an unbiased state, i.e., when the light fixture 102 is outside of the frame 104, the mounting springs 106A and 106B extend from the heat sink 108 to a position beyond the mounting flange 112. For example, the heat sink 108 includes a plurality of fins, two of which are called out at 109A and 109B, and the mounting spring 106A is secured between fins 109A and 109B, as illustrated. FIGS. 1D and 1E illustrate side views of the light fixture 102, each showing the general position and extent of the mounting springs 106A and 106B relative to the heat sink 108, decorative trim portion/protective shroud 110, and the mounting flange 112.

Figure 1F:
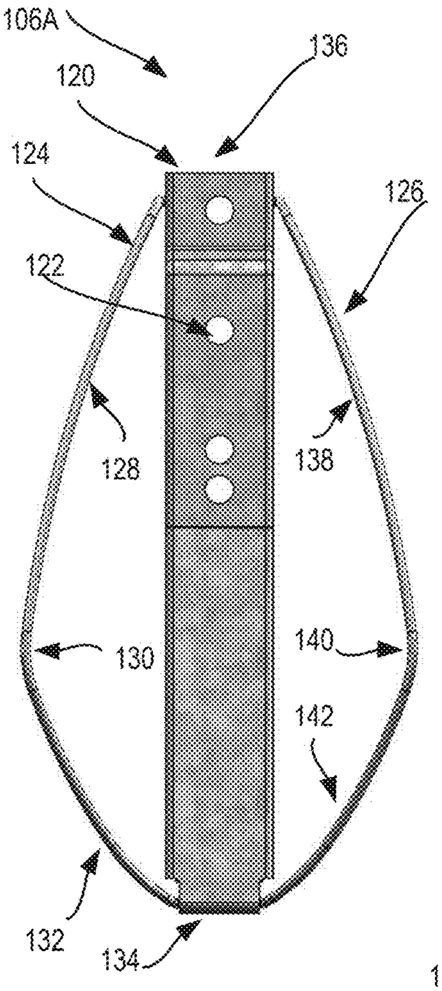
Figure 1G:
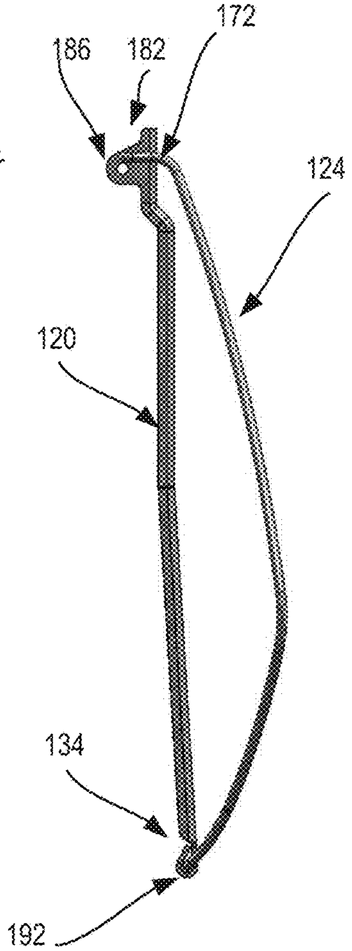
Figure 1H:
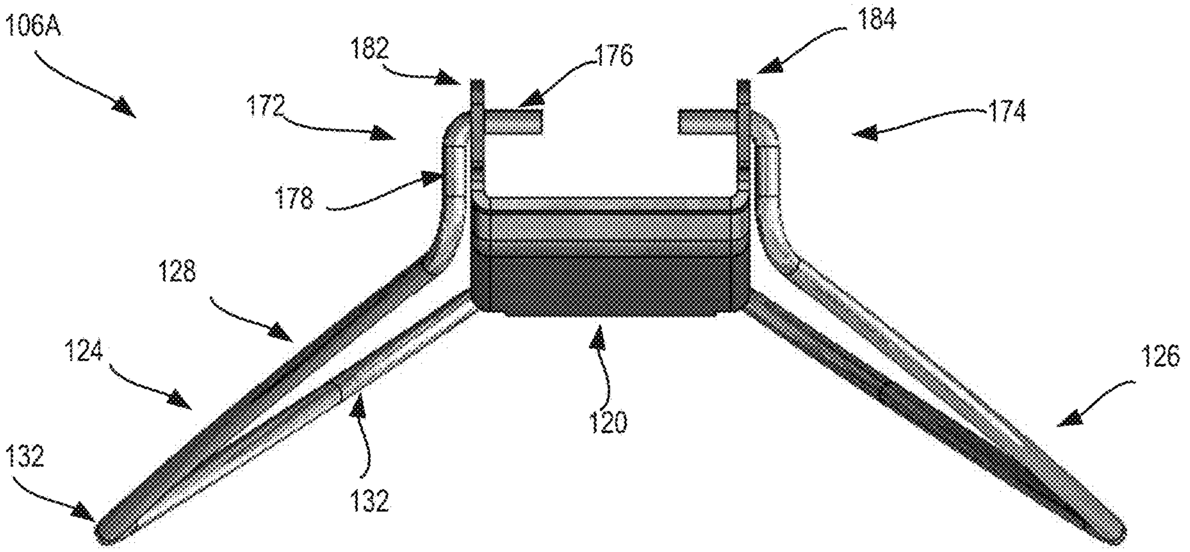
Figure 1J:
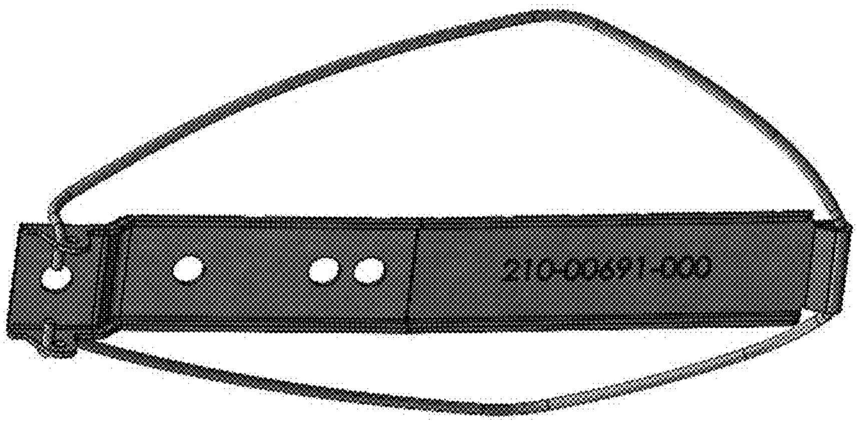
Figure 1I:
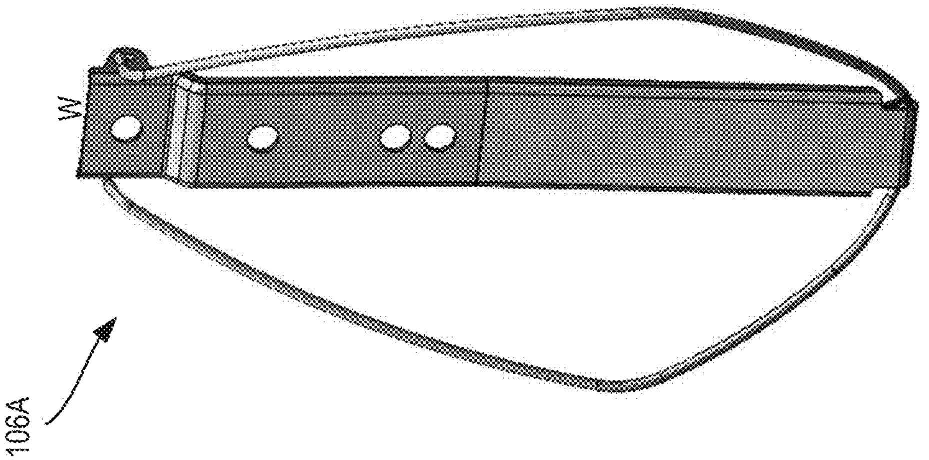

FIGS. 1F-1J illustrates various views of a mounting spring, for example, mounting spring 106A, where FIG. 1F illustrates a face-on view of the mounting spring 106A, FIG. 1G illustrates a side view of the mounting spring 106A, FIG. 1H illustrates a top-down view of the mounting spring 106A, FIG. 1I illustrates a front perspective view of the mounting spring 106A and FIG. 1J illustrates aback perspective view of the mounting spring 106A. Taking FIGS. 1F-1J collectively for the description of the mounting spring 106A, and with continued reference to FIGS. 1A-1E, the mounting spring 106A includes a central bracket member 120 and a pair of wing members 124 and 126 flanked about the central bracket member 120. In particular, wing members 124 and 126 extend away from and forward of the mounting bracket 120, as illustrated. In the embodiments illustrated in FIGS. 1F-1J, the wing members 124 and 126 are formed as a single open-ended unit pivotally mounted to and flanked about the mounting bracket 120. The wing members 124 and 126 are generally formed to have sufficient flexibility to provide a spring action (as described herein) and to have sufficient stiffness (strength) to securely couple the light fixture 102 to the frame 104. In embodiments described herein, the wing members 124 and 126 are generally formed of elongated metal, plastic, polymer, etc. material. In other embodiments, the wing members 124 and 126 are formed as a single closed-loop unit pivotally mounted to and flanked about the mounting bracket 120. In still other embodiments, the wing members 124 and 126 are formed as individual members each pivotally mounted to and flanked about the mounting bracket 120.

The central bracket member 120 may also include a plurality of screw holes, e.g., screw hole 122, to couple the central bracket member 120 to the heat sink 108. The mounting bracket 120 is generally an elongated member having a top fixation portion 136 (which may be generally disposed at or near the top end portion of the mounting bracket 120) generally configured to pivotally couple the top ends 172, 174 of the wing members 124 and 126, respectively (FIG. 1H). The top fixation portion 136 of the mounting bracket 120 includes pivot flares 180 and 182, disposed on either side of the mounting bracket 120 to pivotally couple each respective top end 172/174 of the wing members 124/126, as illustrated in FIG. 1H. Taking pivot flare 182 as an example (FIG. 1G), the pivot flare 182 is generally formed as a rearward protrusion that includes a pivot hole 186 to receive the end 172 of wing member 124. The end 172 of the wing member 124 includes a first portion 176 that is dimensioned to be inserted into the pivot hole 186. The first portion 176 is disposed generally parallel to the body of the mounting bracket 120, as illustrated. The end 172 of the wing member 124 also includes a second portion 178 formed generally perpendicular to and extending from the second portion 176, as illustrated in FIG. 1H. The second portion 128 generally abuts the pivot flare 182 and is joined to a first extension portion 128 (described below) of the wing member 124. Wing member 126 is fashioned in a similar manner as wing member 124, and is generally formed as a mirror image of wing member 124, as illustrated.

The mounting bracket 120 also includes a bottom fixation portion 134 (which may be generally disposed at or near the bottom end portion of the mounting bracket 120) generally configured to pivotally couple the bottom portions of the wing members 124 and 126, respectively (FIGS. 1F and 1G). In one example embodiment the bottom fixation portion 134 includes a ring or retaining portion 192 configured to hold the bottom ends of second extension members 132/142 (described below) of wing members 124/126.

As stated, the wing members 124 and 126 form two loops, each of which extend away from each other and extend away (forward) from the central bracket member 120. The wing members 124 and 126 are affixed to the central bracket member 120 at the top portion 136 of the central bracket member 120 and a bottom portion 134 of the central bracket member 120. Wing member 124 includes a first extension portion 128. In one example embodiment, the first extension portion 128 is a generally straight or curved portion 128 extending from the top portion 136 of the central bracket member 120 and extending to a knee portion 130. Wing member 124 also includes a second extension portion 132. In one example embodiment, the second extension portion 132 is a generally straight or curved portion 132 extending from the bottom portion 134 of the central bracket member 120 and extending to the knee portion 130. The knee portion 130 provides an "inflection" point between the first and second extension portions 128/132, such that the first extension portion 128 extends away from the top portion 136 of the mounting bracket 120, and the second extension portion 132 extends away from the bottom portion 136 of the mounting bracket 120 and the first and second extension portions 128 and 132 are joined at the knee portion 130, as illustrated. In this embodiment, the second extension portion 132 has a length that is less than the first extension portion 128. "Generally straight" and "curved", as used in any embodiment herein, are generally defined as terms of degree such that the amount of "straightness" or "curvature" of the first and or second generally straight or curved portions 128/132 is selected to achieve the operational features described herein to mount the light fixture 102 to the frame 104, and may also be selected based on particular features of the light fixture 102 and/or frame 104 and/or clearance constraints and/or tolerances of the various cooperating components of the embodiments described herein, for example clearance constraints and/or tolerances of the light fixture 102 and/or frame 104 when disposed within a ceiling.

Similarly, wing member 126 includes a first extension portion 138 extending from the top portion 136 of the central bracket member 120 and extending to a knee portion 140. Wing member 126 also includes a second extension portion 142 extending from the bottom portion 134 of the central bracket member 120 and extending to the knee portion 140. The knee portion 140 provides an "inflection" point between the second extension portion 142 and the first extension portion 138, as described above for wing member 124. In this embodiment, the second extension portion 142 has a length that is less than the first extension portion 138. Also in this embodiment, the first extension portion 138 of wing member 126 has a length that is substantially equal to the length of the first extension portion 128 of wing member 124, and the second extension portion 142 of wing member 126 has a length that is substantially equal to the length of the second extension portion 132 of wing member 124. Thus, an angle formed between the central bracket member 120 and the second extension portions 132/142 is generally greater than an angle formed between the central bracket member 120 and the first extension portions 128/138. Of course, mounting spring 106B may be formed in a similar fashion as mounting spring 106A, described above.

The wing members 124 and 126 may each be formed of metal, plastic, polymers, etc., and are generally formed to have a torsion spring effect as the wings 124 and 126 are urged apart from one another (i.e., the knee portions 130 and 140 are urged further apart from one another and toward the plane of the central bracket member 120). Thus, the thickness of the wing members 124 and 126 are selected to accommodate the torsion spring effect and to return to a "rest state" as spread forces on the wing members 124/126 are reduced, as described below.

Figure 1K:
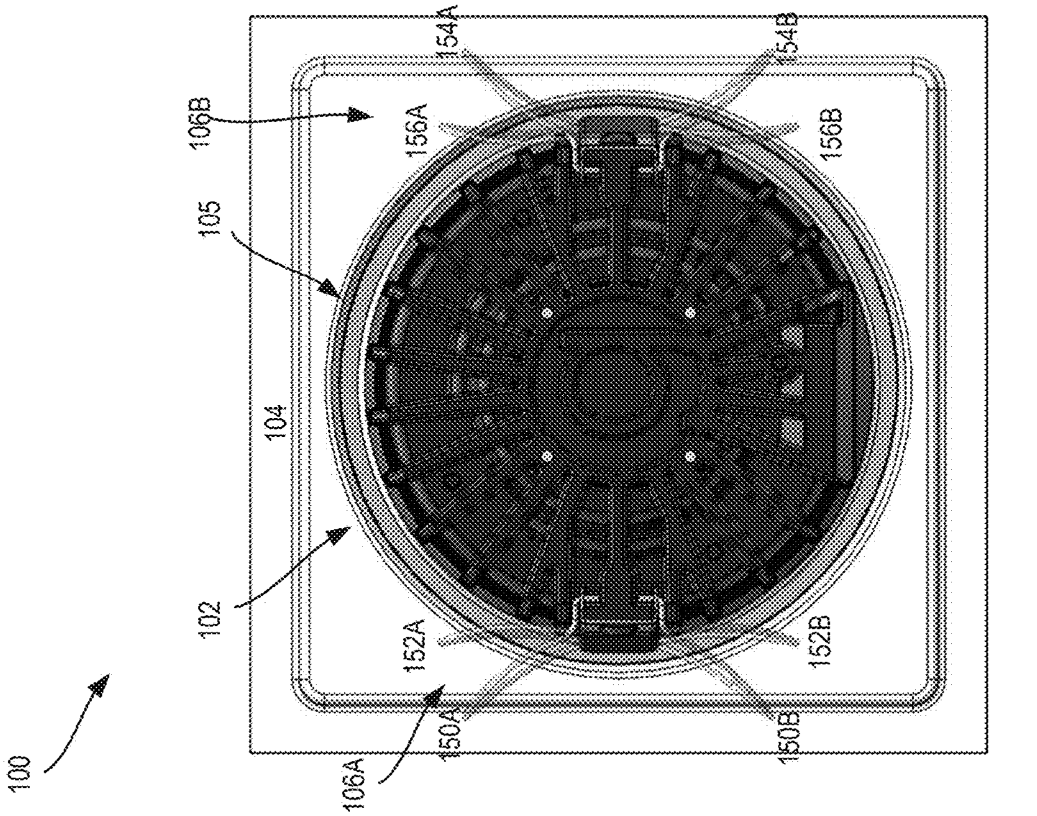

FIG. 1K illustrates a top down view of the structure 100, and in particular illustrates the spring action of the wings of the mounting springs 106A and 106B. Taking mounting spring 106A as an example, as the light fixture 102 is moved into the opening 105 of the frame 104, the wings of mounting spring 106A spread apart from a static state 150A/150B to a biased state 152A/152B. Once the light fixture 102 has moved sufficiently into the frame, the wings of spring 106A return approximately to the static state 150A/150B. Similarly, for mounting spring 106B, as the light fixture 102 is moved into the opening 105 of the frame 104, the wings of mounting spring 106B spread apart from a static state 154A/154B to a biased state 156A/156B. Once the light fixture 102 has moved sufficiently into the frame 104, the wings of spring 106B return approximately to the static state 154A/154B.

With continued reference to FIGS. 1F-1J, and using spring 106A as an example, initially as the light fixture 102 is urged (upward) into opening 105 of frame 104, a sidewall of the opening 105 of the frame 104 presses against the first extension portions 128/138 causing them to spread out with respect to each other, thus biasing the wings. The wings continue to be further biased as the light fixture 102 is moved upward through the opening, where maximum bias occurs when the knee portions 130/140 are pressed against the sidewall of the opening 105. As movement of the light fixture 102 continues upward and as the knee portions 130/140 are urged past the rim of the opening 105, the second extension portions 132/142 are pressed against the sidewall of the opening 105 and the biasing of the spring 106A is reduced, thus allowing the wings to close on each other.

Figure 1L:
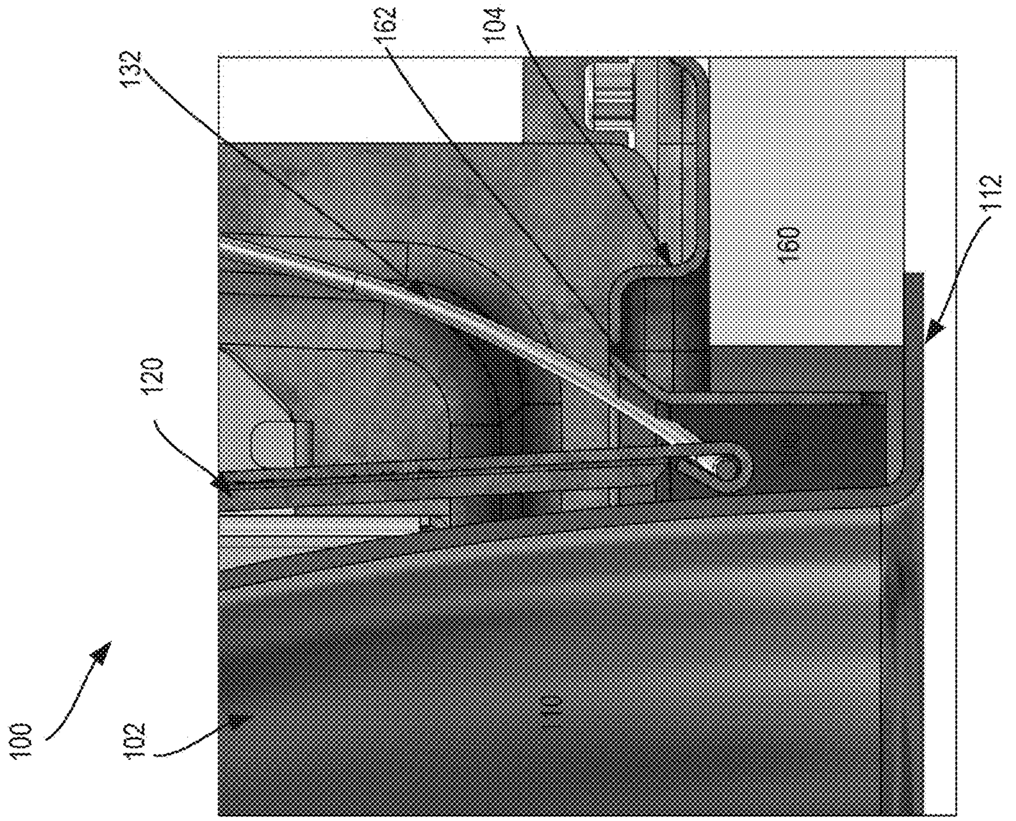

FIG. 1L illustrates a cross-sectional view of the structure 100, and in particular is a cross sectional view of the light fixture 102 installed into the frame 104 in a ceiling. In this embodiment, frame 104 includes a flange portion 162 extending around the periphery of the opening 105, as illustrated. The second extension portion 132 is pressed against the flange portion 162 to that the light fixture 102 remains secured to the frame 104. As illustrated, upward movement of the light fixture 102 is complete when the mounting ring 112 presses against a ceiling tile 160, and thus, the ceiling tile 160 is sandwiched between the frame 104 and mounting ring 112. Of course, mounting spring 106B operates in a similar manner as mounting spring 106A FIGS. 2A-2L illustrate various views of a ceiling light structure 200 according to another embodiment of the present disclosure. FIG. 2A illustrates a perspective view of the ceiling light structure 200. The ceiling light structure 200 includes a light fixture 202, a frame 204, and mounting springs 206A and 206B to secure the light fixture 202 to the frame 204, as will be described in greater detail below. This embodiment is similar the embodiment of FIGS. 1A-IL, except in this embodiment the light fixture 202 has a generally rectangular cross-sectional shape. The frame 204 is generally dimensioned to be positioned above a ceiling element, for example, above a drop ceiling tile, etc. The ceiling light structure 200 also includes electronic components, shown generally at 207, disposed on/adjacent the frame 204 to drive the light fixture 202, as is known. The light fixture 202 may include any known or after-developed in-ceiling light fixture, for example, recessed LED fixture, incandescent fixture, etc.

Figure 2B:
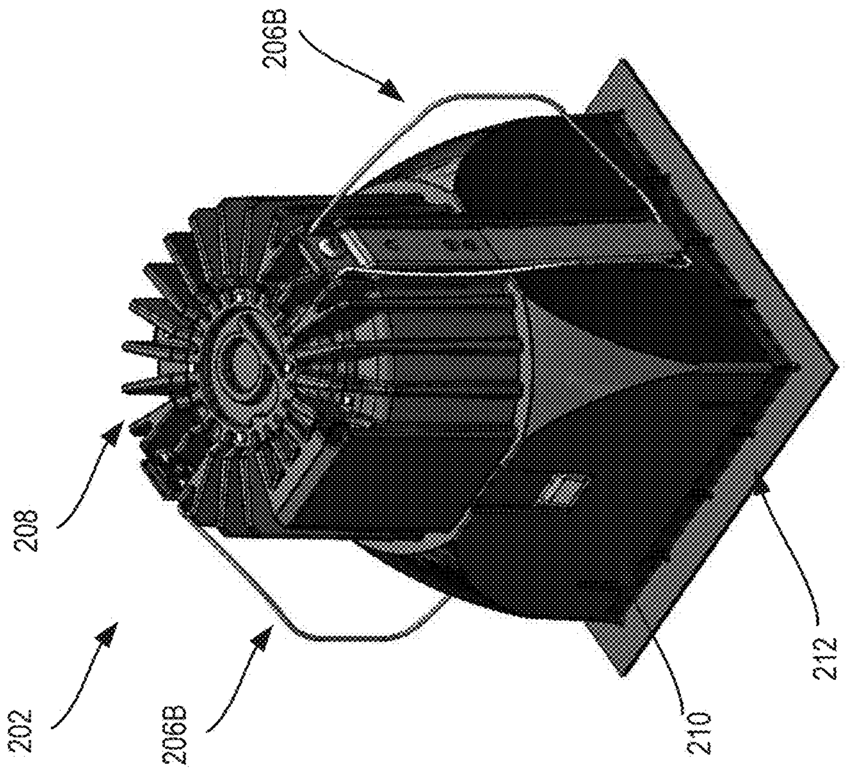
FIGS. 2A-2L illustrate various views of various features of a ceiling light structure according to another embodiment of the present disclosure.
Figure 2A:
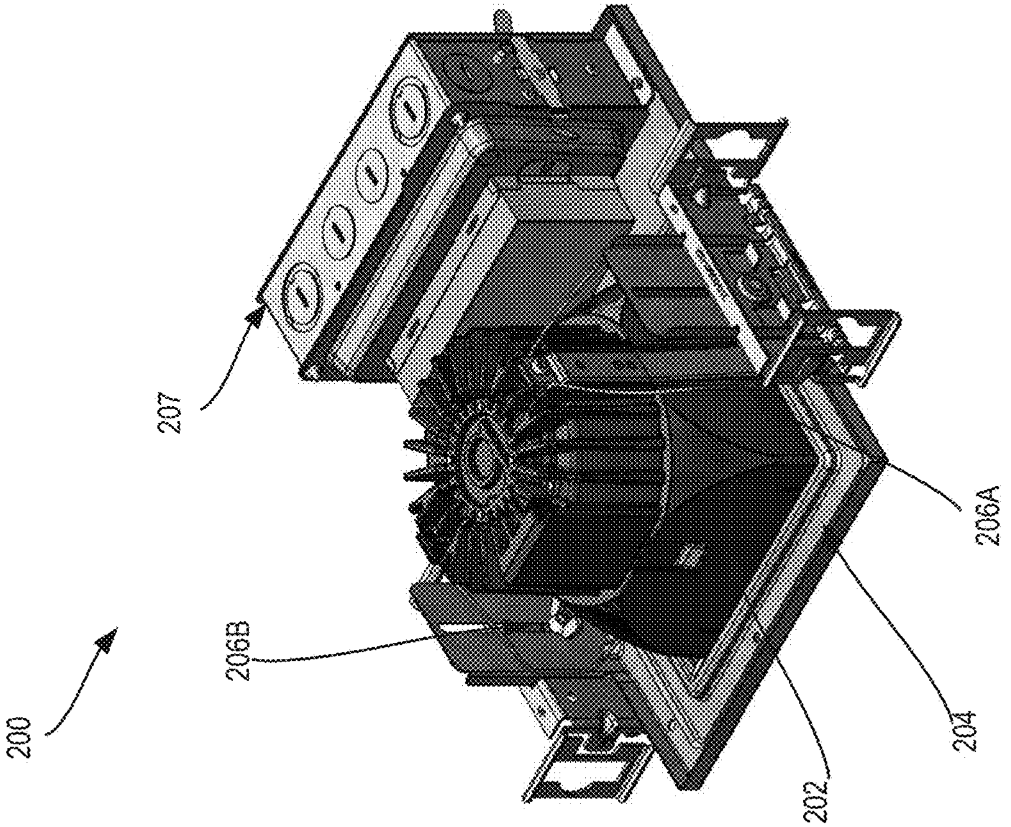
Figure 2C:
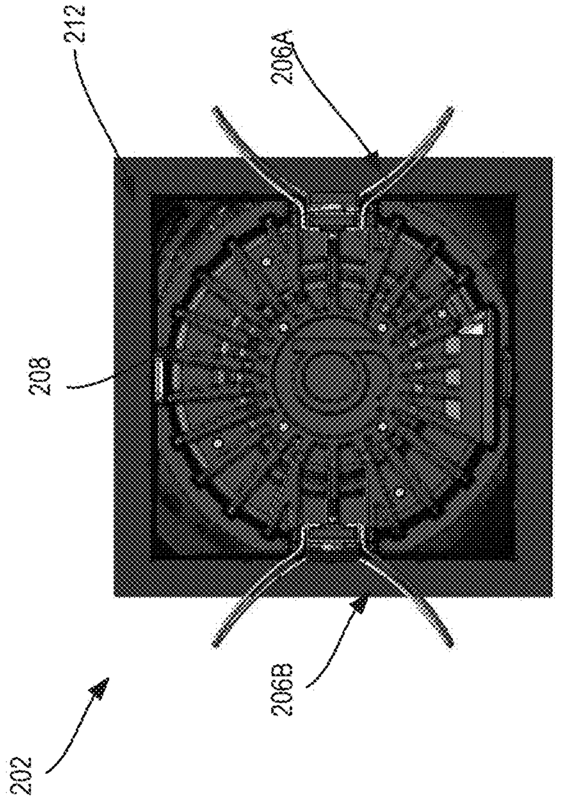
Figure 2D:
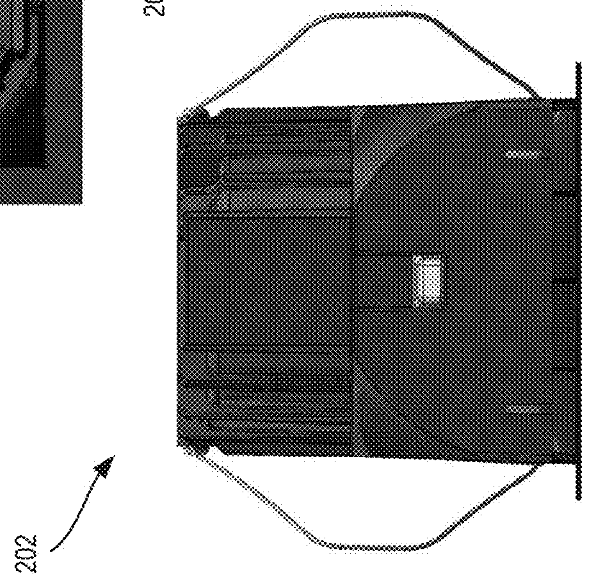
Figure 2E:
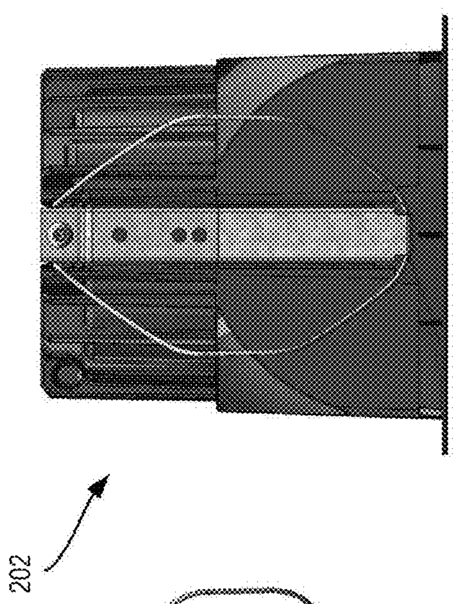

FIG. 2B illustrates a perspective view of the light fixture 202. The light fixture 202 includes a heat sink 208, a decorative trim portion/protective shroud 210 coupled to the heat sink 208, and a mounting flange 212 disposed about the end portion of the decorative trim portion/protective shroud 210. The mounting springs 206A and 206B are coupled to opposing sides of the heat sink 208, as will be described in greater detail below. FIG. 2C illustrates a top-down view of the light fixture 202. As illustrated, in an unbiased state, i.e., when the light fixture 202 is outside of the frame 204, the mounting springs 206A and 206B extend from the heat sink to a position beyond the mounting ring 212. FIGS. 2D and 2E illustrate side views of the light fixture 202, each showing the general position and extent of the mounting springs 206A and 206B relative to the heat sink 208, decorative trim portion/protective shroud 210, and the mounting flange 212.

Figure 2F:
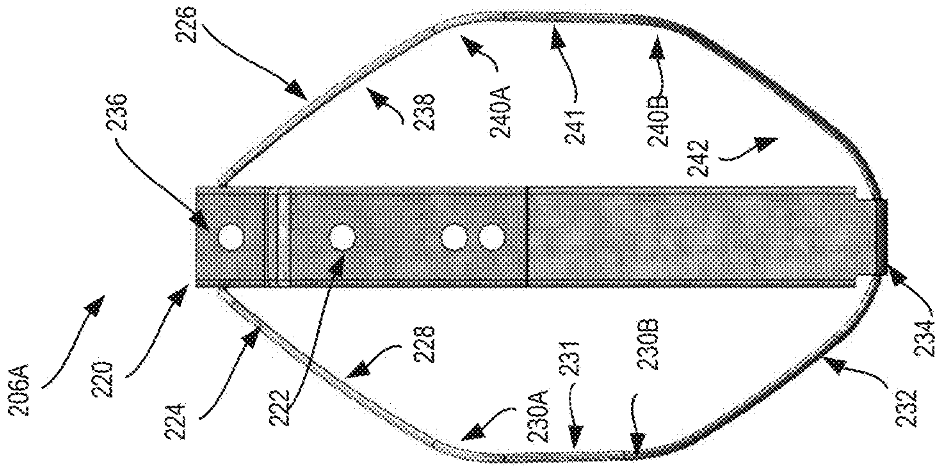
Figure 2G:
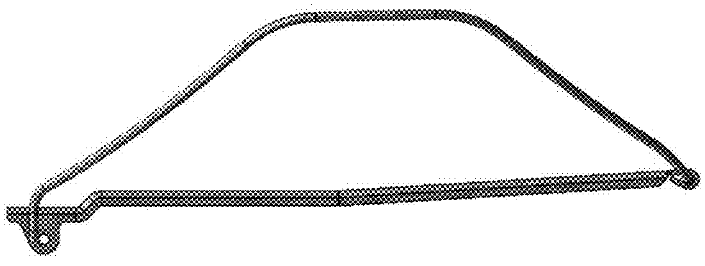
Figure 2H:
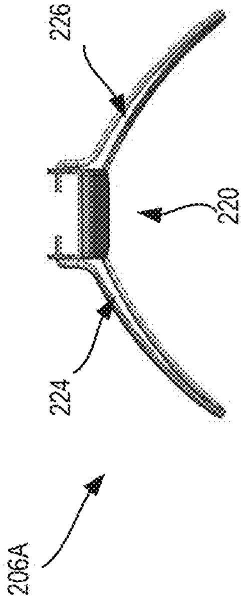

FIGS. 2F-2H illustrates various views of a mounting spring, for example, mounting spring 206A. The mounting spring 206A includes a central bracket member 220 and a pair of wing members 224 and 226 flanked about the central bracket member 220. The central bracket member 220 may also include a plurality of screw holes, e.g., screw holes 222, to couple the central bracket member 220 to the heat sink 208. The wing members 224 and 226 form loops that extend away from each other and extend away from the central bracket member 220. The wing members 224 and 226 are affixed to the central bracket member 220 at a top portion 236 of the central bracket member 220 and a bottom portion 234 of the central bracket member 220. Wing member 224 includes a first extension portion 228 extending from the top portion 236 of the central bracket member 220 and extending to a first knee portion 230A and extending away from the central bracket member 220. Wing member 224 also includes a second portion 231 extending from the first knee portion 230A to a second knee portion 230B. The second portion 231 is approximately parallel to the long axis of the central bracket member 220. Wing member 224 also includes a third extension portion 232 extending from the bottom portion 234 of the central bracket member 220 and extending to the second knee portion 230B. The knee portions 230A/230B provide "inflection" points between the third extension portion 232 and the first extension portion 228. In this embodiment, the first, second and third extension portions 228/231/232 are each approximately equal in length, although, in other embodiments, the lengths of the first, second and third extension portions 228/231/232 may be unequal.

Similarly, wing member 226 includes a first, second and third extension portions 228/231/232 portion 238 extending from the top portion 236 of the central bracket member 220 and extending to a first knee portion 240A. Wing member 226 also includes a second portion 241 extending from the first knee portion 240A to a second knee portion 240B. The second portion 241 is approximately parallel to the long axis of the central bracket member 220 and approximately parallel to the second portion 231 of wing 224. Wing member 226 also includes a third extension portion 242 extending from the bottom portion 234 of the central bracket member 220 and extending to the second knee portion 240B. The knee portions 240A/240B provide "inflection" points between the third extension portion 242 and the first extension portion 238. In this embodiment, the first, second and third extension portions 238/241/242 are each approximately equal in length, although, in other embodiments, the lengths of the first, second and third extension portions 238/241/242 may be unequal.

Of course, mounting spring 206B may be formed in a similar fashion as mounting spring 206A, described above.

The wing members 224 and 226 may each be formed of metal, plastic, polymers, etc., and are generally formed to have a torsion spring effect as the wings 224 and 226 are urged apart from one another (i.e., the knee portions 230A/230B and 240A/240B are urged further apart from one another and toward a plane of the central bracket member 220). Thus, the thickness of the wing members 224 and 226 are selected to accommodate the torsion spring effect and to return to a "rest state" as spread forces on the wing members 224/226 are reduced, as described below.

Figure 2I:
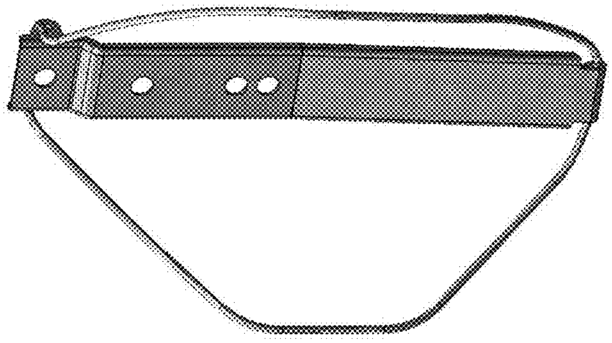

FIG. 2I illustrates a top down view of the structure 200, and in particular illustrates the spring action of the wings of the mounting springs 206A and 206B. Taking mounting spring 206A as an example, as the light fixture 202 is moved into the opening 205 of the frame 204, the wings of mounting spring 206A spread apart from a static state 250A/250B to a biased state 252A/252B. Once the light fixture 202 has moved sufficiently into the frame, the wings of spring 206A return approximately to the static state 250A/250B. Similarly, for mounting spring 206B, as the light fixture 202 is moved into the opening 205 of the frame 204, the wings of mounting spring 206B spread apart from a static state 254A/254B to a biased state 256A/256B. Once the light fixture 202 has moved sufficiently into the frame 204, the wings of spring 206B return approximately to the static state 254A/254B.

With continued reference to FIGS. 2F-2H, and using spring 206A as an example, initially as the light fixture 202 is urged (upward) into opening 205 of frame 204, a sidewall of the opening 205 of the frame 204 presses against the first extension portions 228/238 causing them to spread out with respect to each other, thus biasing the wings. The wings continue to be further biased as the light fixture 202 is moved upward through the opening, where maximum bias occurs when the first knee portions 230A and 240A are pressed against the sidewall of the opening 205. This maximum bias continues while the extension portions 231/241 are pressed against the sidewall of the opening 205, until the second knee portions 230B/240B have cleared the sidewall of the opening 205. As movement of the light fixture 202 continues upward and as the second knee portions 230B/240B are urged past the rim of the opening 205, the third extension portions 232/242 are pressed against the sidewall of the opening 205 and the biasing of the spring 206A is reduced, thus allowing the wings to close on each other. Of course, spring 206B operates in a similar fashion.

Figure 2J:
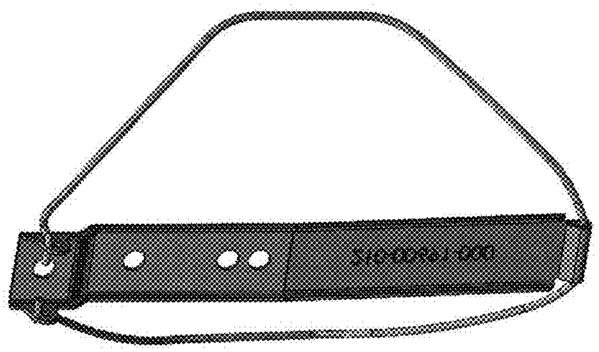
Figure 2K:
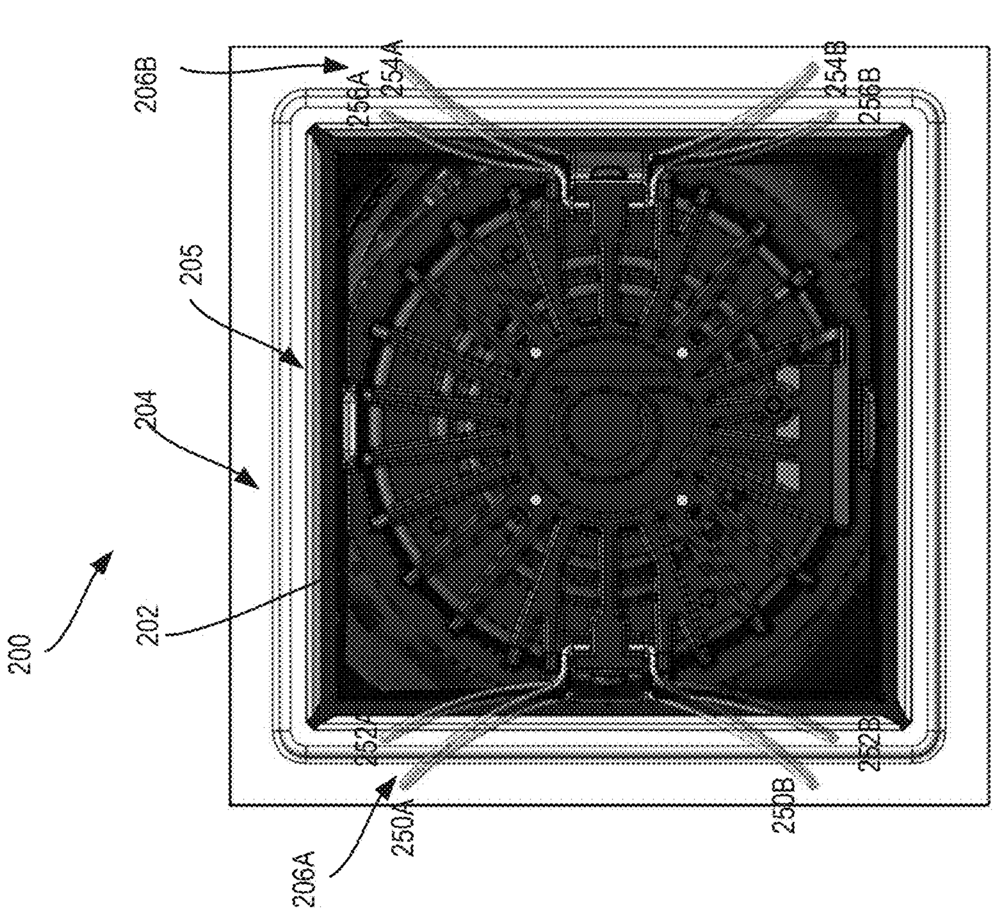
Figure 2L:
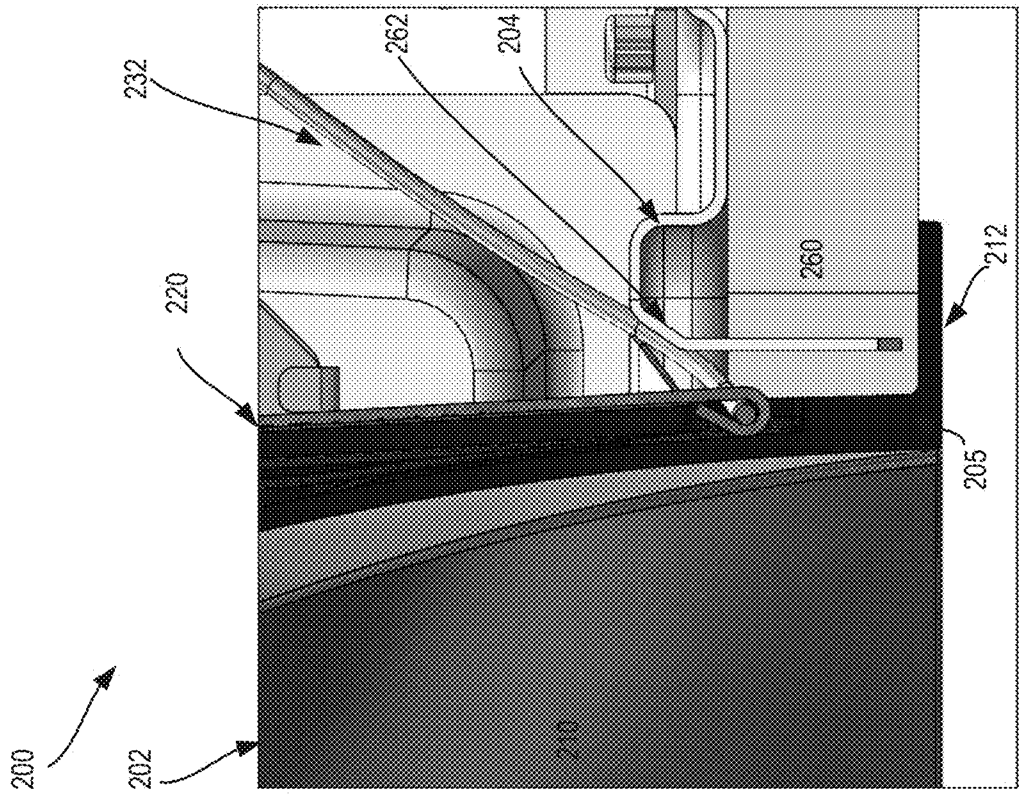

FIG. 2J illustrates a cross-sectional view of the light fixture 202 installed into the frame 204 in a ceiling. In this embodiment, frame 204 includes a flange portion 262 extending around the periphery of the opening 205, as illustrated. The third extension portion 232 is pressed against the flange portion 262 to that the light fixture 202 remains secured to the frame 204. As illustrated, upward movement of the light fixture 202 is complete when the mounting flange 212 presses against a ceiling tile 260, and thus, the ceiling tile 260 is sandwiched between the frame 204 and mounting flange 212.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C. In addition, directional terms such as "top", "bottom", "front", "back", "side", "rearward", "forward", etc. are used herein as orientation terms used in reference to the drawings, and are not meant to limit the embodiments described herein to any particular orientation.

Thus, in one embodiment, the present disclosure provides. . . .

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A spring system for mounting a ceiling fixture, comprising:

a central bracket member having a top portion and a bottom portion; the central bracket member is configured to be coupled to the ceiling fixture;

a first wing member pivotally coupled to the top portion and bottom portion of the central bracket member; the first wing member having a loop shape extending away from the central bracket member in a first direction; the first wing member including a first extension portion, a second extension portion and a first knee portion joining the first extension portion and the second extension portion; wherein the first extension portion extending from the top portion away from the central bracket member toward the first knee portion; wherein the second extension portion extending from the bottom portion away from the central bracket member toward the first knee portion; and a second wing member pivotally coupled to the top portion and bottom portion of the central bracket member; the first wing member having a loop shape extending away from the central bracket member in a second direction; wherein the first and second directions are opposing; the second wing member including a first extension portion, a second extension portion and a second knee portion joining the first extension portion and the second extension portion; wherein the first extension portion extending from the top portion away from the central bracket member toward the second knee portion; wherein the second extension portion extending from the bottom portion away from the central bracket member toward the second knee portion;

wherein the wing members having a first unbiased position to a second biased position; wherein the second biased position is represented as a spreading the wings away from one another and further away from the central bracket member.

2. The spring system of claim 1, wherein the first and second extension portions of the first wing member are approximately straight, and the first and second extension portions of the second wing member are approximately straight.

3. The spring system of claim 1, wherein the first and second extension portions of the first wing member are curved, and the first and second extension portions of the second wing member are curved.

4. The spring system of claim 1, wherein the first extension portion of the first wing member and first extension portion of the second wing member are approximately equal in length, and the second extension portion of the first wing member and second extension portion of the second wing member are approximately equal in length.

5. The spring system of claim 1, wherein movement of the central bracket member in relative to a frame causes the first extension of the first wing member and the first extension of the second wing member to contact the frame and causes increasing pressure on the first extension of the first wing member and the first extension of the second wing member to cause the wing members to pivot from the first unbiased position to the second biased position.

6. The spring system of claim 5, wherein the pressure on the wing members is at a maximum when continued movement of the central bracket member relative to the frame causes the first and second knee portions to contact the frame; and wherein the pressure on the wing members is reduced when continued movement of the central bracket member relative to the frame causes the second extension of the first wing member and the second extension of the second wing member to contact the frame.

7. A spring system for mounting a ceiling fixture, comprising:

a central bracket member having a top portion and a bottom portion; the central bracket member is configured to be coupled to the ceiling fixture;

a first wing member pivotally coupled to the top portion and bottom portion of the central bracket member; the first wing member having a loop shape extending away from the central bracket member in a first direction; the first wing member including a first extension portion, a second portion, a first knee portion joining the first extension portion and the second portion, a second extension portion, and a second knee portion joining the second extension portion to the second portion; wherein the first extension portion extending from the top portion away from the central bracket member toward the first knee portion; wherein the second extension portion extending from the bottom portion away from the central bracket member toward the second knee portion; and a second wing member pivotally coupled to the top portion and bottom portion of the central bracket member; the first wing member having a loop shape extending away from the central bracket member in a second direction; wherein the first and second directions are opposing; the second wing member including a first extension portion, a second portion, a first knee portion joining the first extension portion and the second portion, a second extension portion, and a second knee portion joining the second extension portion to the second portion; wherein the first extension portion extending from the top portion away from the central bracket member toward the first knee portion; wherein the second extension portion extending from the bottom portion away from the central bracket member toward the second knee portion;

wherein the wing members having a first unbiased position to a second biased position; wherein the second biased position is represented as a spreading the wings away from one another and further away from the central bracket member.

8. The spring system of claim 7, wherein the first and second extension portions of the first wing member are approximately straight, and the first and second extension portions of the second wing member are approximately straight, and the second portion of the first wing member is approximately straight, and the second portion of the second wing member is approximately straight.

9. The spring system of claim 7, wherein the first and second extension portions of the first wing member are curved, and the first and second extension portions of the second wing member are curved, and the second portion of the first wing member is approximately straight, and the second portion of the second wing member is approximately straight.

10. The spring system of claim 7, wherein the first extension portion of the first wing member and first extension portion of the second wing member are approximately equal in length, and the second extension portion of the first wing member and second extension portion of the second wing member are approximately equal in length.

11. The spring system of claim 7, wherein movement of the central bracket member in relative to a frame causes the first extension of the first wing member and the first extension of the second wing member to contact the frame and causes increasing pressure on the first extension of the first wing member and the first extension of the second wing member to cause the wing members to pivot from the first unbiased position to the second biased position.

12. The spring system of claim 11, wherein the pressure on the wing members is at a maximum when continued movement of the central bracket member relative to the frame causes the first and second knee portions to contact the frame; and wherein the pressure on the wing members is reduced when continued movement of the central bracket member relative to the frame and past the second knee portions of the first and second wings causes the second extension of the first wing member and the second extension of the second wing member to contact the frame.

13. A ceiling fixture, comprising:

a frame configured to be disposed in a ceiling;

a ceiling fixture configured to be removeable affixed to the frame;

a central bracket member having a top portion and a bottom portion; the central bracket member is configured to be coupled to the ceiling fixture;

a first wing member pivotally coupled to the top portion and bottom portion of the central bracket member; the first wing member having a loop shape extending away from the central bracket member in a first direction; the first wing member including a first extension portion, a second extension portion and a first knee portion joining the first extension portion and the second extension portion; wherein the first extension portion extending from the top portion away from the central bracket member toward the first knee portion; wherein the second extension portion extending from the bottom portion away from the central bracket member toward the first knee portion; and a second wing member pivotally coupled to the top portion and bottom portion of the central bracket member; the first wing member having a loop shape extending away from the central bracket member in a second direction; wherein the first and second directions are opposing; the second wing member including a first extension portion, a second extension portion and a second knee portion joining the first extension portion and the second extension portion; wherein the first extension portion extending from the top portion away from the central bracket member toward the second knee portion; wherein the second extension portion extending from the bottom portion away from the central bracket member toward the second knee portion;

wherein the wing members having a first unbiased position to a second biased position; wherein the second biased position is represented as a spreading the wings away from one another and further away from the central bracket member.

14. The spring system of claim 13, wherein the first and second extension portions of the first wing member are approximately straight, and the first and second extension portions of the second wing member are approximately straight.

15. The spring system of claim 13, wherein the first and second extension portions of the first wing member are curved, and the first and second extension portions of the second wing member are curved.

16. The spring system of claim 13, wherein the first extension portion of the first wing member and first extension portion of the second wing member are approximately equal in length, and the second extension portion of the first wing member and second extension portion of the second wing member are approximately equal in length.

17. The spring system of claim 13, wherein movement of the central bracket member in relative to the frame causes the first extension of the first wing member and the first extension of the second wing member to contact the frame and causes increasing pressure on the first extension of the first wing member and the first extension of the second wing member to cause the wing members to pivot from the first unbiased position to the second biased position.

18. The spring system of claim 17, wherein the pressure on the wing members is at a maximum when continued movement of the central bracket member relative to the frame causes the first and second knee portions to contact the frame; and wherein the pressure on the wing members is reduced when continued movement of the central bracket member relative to the frame causes the second extension of the first wing member and the second extension of the second wing member to contact the frame.

* * * * *